United States Patent
Kiselev et al.

(10) Patent No.: US 6,712,319 B2
(45) Date of Patent: Mar. 30, 2004

(54) METHOD FOR PLACING PAYLOAD IN ORBIT BY MULTIFUNCTIONAL LAUNCH VEHICLE OF COMBINED SCHEME WITH CRUISE LIQUID ROCKET ENGINE SYSTEM (LRES), MULTIFUNCTIONAL LAUNCH VEHICLE OF COMBINED SCHEME WITH CRUISE LRES AND METHOD OF REFINING IT

(75) Inventors: Anatoly Ivanovich Kiselev, Moscow (RU); Alexandr Alexeevich Medvedev, Moscow (RU); Vladimir Konstantinovich Karrask, Moscow (RU); Gennady Dmitrievich Dermichev, Moscow (RU); Igor Sergeevich Radugin, Moscow (RU); Sergei Alexandrovich Petrokovsky, Moscow (RU); Evgeny Ivanovich, Moscow (RU); Vasily Jurievich Juriev, Moscow (RU)

(73) Assignee: Gosudarstvenny Kosmichesky Nauchno-Proizvodstvenny Tsentr TM. M.V. Khrunicheva, Moscow (RU)

( * ) Notice: Subject to any disclaimer, the term of this patent is extended or adjusted under 35 U.S.C. 154(b) by 0 days.

(21) Appl. No.: 10/336,813

(22) Filed: Jan. 6, 2003

(65) Prior Publication Data

US 2003/0098397 A1 May 29, 2003

Related U.S. Application Data

(62) Division of application No. 09/972,006, filed on Oct. 9, 2001, now Pat. No. 6,581,881, which is a continuation of application No. PCT/RU00/00406, filed on Oct. 13, 2000.

(30) Foreign Application Priority Data

Feb. 7, 2000 (RU) ....................................... 2000102687

(51) Int. Cl.[7] ................................................. B64G 1/40

(52) U.S. Cl. ..................................... 244/172; 244/158 R
(58) Field of Search ............................. 244/172, 158 R, 244/63, 74; 60/225, 250, 263

(56) References Cited

U.S. PATENT DOCUMENTS

| 4,796,839 A | | 1/1989 | Davis |
| 4,964,340 A | * | 10/1990 | Daniels et al. |
| 5,141,181 A | | 8/1992 | Leonard |
| 5,143,328 A | * | 9/1992 | Leonard |
| 5,217,187 A | * | 6/1993 | Criswell |
| 5,217,188 A | | 6/1993 | Thole et al. |
| 5,242,135 A | | 9/1993 | Scott |

(List continued on next page.)

FOREIGN PATENT DOCUMENTS

| EP | 0763468 | 3/1997 |
| GB | 1114414 | 6/1964 |
| WO | WO01/56880 | 9/2001 |

OTHER PUBLICATIONS

Russell, Dale and Newell, Jim. "Designing for the Long Term." Technical Articles. Summer 1993.*

(List continued on next page.)

*Primary Examiner*—Tien Dinh
(74) *Attorney, Agent, or Firm*—Burns, Doane, Swecker & Mathis, LLP

(57) ABSTRACT

The invention relates to a space-rocket technology and can be used for placing both a pilot-controlled and unpiloted space craft in the earth's orbit. The inventive method consists in igniting-up cruising liquid-fuel rocket engines (LRE) of all assembly units, when the propulsion power of LRE of the side units is set to maximum and the LRE of the central unit is set relatively low.

1 Claim, 9 Drawing Sheets

U.S. PATENT DOCUMENTS 5,568,901 A     10/1996  Stiennon
5,979,833 A  *  11/1999  Eller et al.
6,446,905 B1 *  9/2002   Campbell et al.
6,491,256 B1 *  12/2002  Wingo

OTHER PUBLICATIONS

Fastrac Engine–A Boost for Low–cost Space Launch. NASA Fact Sheet. 2/99.*

"ASTRID Rocket Fligth Test" E&TR Jul. 1994.*

"Rocket—Space Complex Launch Vehicle", edited by Prof. S.O. Osipova, Military Publisher of USSR Ministry of Defense—1981, Moscow, Voenizdat, 1981, pp. 19–22, Fig. 1.2.

"Astronautics and Rocket Dynamics", Editor M. Sc. I.I. Shuneyko, USSR State Committee on Science and Engineering, USSR Academy of Sciences, All–Union Institute of Scientific and Engineering Information (VNIITI), No. 35, Moscow 1988.

"Guaranteed to Lower the Price of Victory—New Navy Fighters, The Future of Naval Aircraft", Boeing, Advertiser Sponsored Market Supplement, Aviation Week & Space Technology, Mar. 29, 1999.

* cited by examiner

METHOD FOR PLACING PAYLOAD IN ORBIT BY MULTIFUNCTIONAL LAUNCH VEHICLE OF COMBINED SCHEME WITH CRUISE LIQUID ROCKET ENGINE SYSTEM (LRES), MULTIFUNCTIONAL LAUNCH VEHICLE OF COMBINED SCHEME WITH CRUISE LRES AND METHOD OF REFINING IT

This application is a divisional of U.S. patent application Ser. No. 09/972,006, filed on Oct. 9, 2001, now U.S. Pat. No. 6,581,881 which was a continuation of International Application No. PCT/RU00/00406 filed on Oct. 13, 2000.

FIELD OF THE INVENTION

The invention relates to the field of rocket-space engineering and may find application during the development of rocket-space systems serving to place manned and unmanned spacecraft, and also other objects of different purpose, on a near-earth orbit.

BACKGROUND OF THE INVENTION

The modern development of space engineering requires the creation of launch vehicles which are capable of delivering spacecraft of different purpose and mass to near-earth orbits at a height of 180–34000 km. Where there is such a variety of tasks, the demand arises for the presence of multifunctional launch vehicles which are capable in the basic or other arrangement of performing these tasks. Launch vehicles of a combined scheme with a multiunit lower stage satisfy this requirement in the best manner. Appropriately selecting the rocket units of the lower stage, it is possible over wide ranges to change the characteristics of the launch vehicle as a whole, achieving their greatest correspondence to the launch program. The advantages of launch vehicles of the combined scheme are manifested to the greatest degree when one of the rocket units of the lower multiunit stage, mainly the central, works for a longer period than the other units. Launch vehicles of the combined scheme make it possible to also optimize the ascent of spacecraft into a near-earth orbit.

A typical example of the use of a multiunit lower stage for placing a payload into a near-earth orbit is the "Ariane" project, in particular, "Ariane-5" (see, for example, Aviation Week and Space Technology, No. 13, 1999, pp. 61, 64–65). The launch vehicle "Ariane-5" has a lower multiunit assembly of rocket units, including a central rocket unit with a cruise LRES and two side rocket units with cruise solid propellant rocket engines (SPREs). The project provides for the use of two variants of a central rocket unit and several variants of side rocket units with different operating times and thrust level of the cruise engines. An acceleration rocket unit and the head unit with the payload are connected to the central rocket unit in accordance with a tandem scheme. At lift-off both SPREs and the LRES of the central rocket unit are fired. When operation of the SPREs ceases, the side rocket units are jettisoned and the launch vehicle continues acceleration with the aid of the cruise LRES of the central rocket unit. When the launch vehicle "Ariane-5" with an enlarged central rocket unit is used, it possible to place a payload with a mass of from 8 tons to 12 tons into a near-earth orbit from the KURU cosmodrome. In order to ascend a smaller payload, for example, with a mass of 6 tons, another central unit with another cruise LRES is necessary. Thus, when a typical construction of a launch vehicle of a combined scheme is used, it is possible, without changing the central rocket unit, to change the mass of the payload being placed into orbit by 1.5 times, which is a typical range of change of the mass of the payload for a modern launch vehicle of the combined scheme. During the refinement of this launch vehicle, separate refinement of the central rocket unit and the side rocket units in all their variants is necessary, and also the testing of different assemblies of the launch vehicle. Since different variants of the rocket units are used in the assembly of the launch vehicle, the refinement of the launch vehicle as a whole takes a large amount of time and requires large expenditures. Furthermore, operation of the launch vehicle is possible only after refinement of at least one assembly of the central and two side rocket units. A substantial drawback of all launch vehicles of a combined scheme, which use side rocket units with SPREs, is the increased ecological contamination of the atmosphere with compounds of chlorine, which are contained in large amounts in the products of combustion of the solid propellant. The increase in the energetic characteristics of the solid propellant results in additional contamination of the atmosphere with toxic products of the combustion of the solid propellant.

Other variants of use of a combined launch vehicle for the ascent of a payload into a near-earth orbit are also proposed.

A method for placing a payload into orbit by a multifunctional launch vehicle of a combined scheme is known and disclosed in U.S. Pat. No. 4,964,340, class 102/377, B 64 G 1/40, Oct. 23, 1990. In accordance with this patent an acceleration rocket unit and a head unit with a payload are mounted on a central rocket unit with a SPRE. A lower multiunit assembly of rocket units is formed by connection of from two to six side rocket units with SPREs to the central rocket unit in accordance with a launch program. During lift-off of a launch vehicle with six side rocket units, SPREs of four lift-off side rocket units are fired and acceleration of the launch vehicle begins. Prior to cutting off the aforesaid rocket units, SPREs of the two remaining side rocket units are fired, after which the four spent rocket units are jettisoned and acceleration of the launch vehicle is continued with use of two SPREs. Before they are cut off, the SPRE of the central rocket unit is fired and the two spent side rocket units are jettisoned. The rocket engines of the acceleration unit are fired after operation of the SPRE of the central rocket unit has ended. The aforesaid method is realized in a launch vehicle of a combined scheme, containing a lower multiunit assembly of rocket units with cruise SPREs, including a central and connected thereto side rocket units and tandem secured on the central unit transition compartment, acceleration rocket units and a head unit with the payload, head domes of the side rocket units and a system for securing the side rocket units to the central unit. Two side rocket units are connected to the central rocket unit in a pitch plane, forming a minimum assembly of a combined launch vehicle with three rocket units in the lower multiunit assembly. Two other variants of the launch vehicle, which realize this method, are formed by additionally connecting to the central rocket unit of the launch vehicle a minimum assembly of either two side rocket units, positioned in the pitch plane, or four side rocket units, positioned symmetrically relative to the pitch plane. The known technical solution makes it possible to use a single-type SPRE for all the rocket units in the lower multiunit assembly, which significantly reduces the expenditures on placing the payload into orbit. However, in this solution the energetic possibilities of the lower multiunit assembly of rocket units is not used to the full extent, since during the first stage of operation of the launch vehicle a portion of the rocket units—three out of seven (more than 40%) for the variant with six side rocket units, does not participate in the process of creating thrust and is a passive mass during the first stage of placing the payload into orbit, which impairs the engine weight efficiency of the launch vehicle and results in a reduction of the mass of the payload to be placed in the near-earth orbit. During the realization of this method for placing a payload into a near-earth orbit, higher loads will act on the launch vehicle as a whole and accordingly on the payload when the SPREs of the side rocket units fire, they beginning to operate, for example, prior to termination of operation of the SPREs of lift-off rocket units, since at the moment of firing the additional SPREs a thrust acts on the launch vehicle both from lift-off SPREs and the thrust of the SPREs of two more side rocket units. In spite of the fact that a single-type SPRE is used in the rocket units, in this construction of the launch vehicle it is not possible to use a standardized rocket unit, since in the case of different assemblies of the launch vehicle a central rocket unit is required with different positioning of the units for securing the side rocket units. During the refinement of this launch vehicle, in addition to refinement of the firing of rocket units with SPREs under on-ground conditions, refinement is necessary for firing these units under different altitude conditions, as is presumed by the order of firing SPREs of the rocket units during the placement of the payload into the orbit with different assemblies of the launch vehicle. This launch vehicle is also not safe from the point of view of ecology, since it uses SPREs, the drawbacks of which were noted above.

A method for placing a payload into orbit by a launch vehicle of a combined scheme is also known and disclosed in British patent No. 1114414, class B7W2, FIGS. 4–8, May 22, 1968. In accordance with this patent, an acceleration rocket unit with a payload, which unit is selected in accordance with the launch program, is mounted on the lower stage. The multiunit assembly of rocket units of the lower stage is formed by connection of single-type, delta-like in plan, modules with cruise LRESs to each other with the formation of a pyramidal assembly. The number of modules in the pyramidal assembly may change from four to six depending on the launch program. During lift-off of the launch vehicle the cruise LRESs of all the modules forming the pyramid are fired. The cruise LRESs of all the modules operate with an identical thrust and are cut off simultaneously when the propellant in all the modules of the lower multiunit stage is consumed. All the modules of the lower multiunit stage are jettisoned simultaneously prior to firing the cruise LRES of the acceleration unit. The described method is realized in a launch vehicle of a combined scheme, comprising a lower multiunit assembly of rocket units with cruise LRESs and tandem connected thereto acceleration unit. The lower multiunit stage is formed from single-type, delta-like in plan, modules, which have a triangular cross section. Modules with a spread angle of triangular cross section, corresponding to the number of assembly modules being joined, are used in each of the pyramidal assemblies. The modules are connected to each other along adjacent surfaces. The known technical solution makes it possible to use a single-type LRES for all the rocket units of the lower multiunit assembly, which significantly reduces the expenditures on the placement of the payload into orbit. In spite of the use of a single-type LRES in the rocket units of the lower multiunit assembly, in this construction of the launch vehicle it is not possible to use a standardized rocket unit, since a module rocket unit with a different angle of spread of triangular cross section is required for different assemblies of the launch vehicle. During the placement of the payload into orbit with the use of the method described in this patent with the simultaneous cutoff of all the cruise LRESs of the lower multiunit assembly of rocket units, the main advantage of a combined launch vehicle—the possibility for more lengthy operation of the central unit, disappears, bringing the combined launch vehicle to the traditional tandem arrangement with a heavier lower stage. During the refinement of this launch vehicle, the refinement of each modification of the module rocket unit included in the lower multiunit assembly of rocket units is necessary, which significantly increases the expenditures on the development of the launch vehicle and the cost of placing the payload into a near-earth orbit.

A method of placing a payload into orbit by a launch vehicle of combined scheme is also known and disclosed in U.S. Pat. No. 5,141,181, class 244/172, Aug. 25, 1992. In accordance with this patent when a payload is being placed into orbit by a multifunctional combined-scheme launch vehicle with cruise LRESs in accordance with a launch program, tandem positioned rocket unit and head unit with the payload are connected to the central rocket unit and a lower multiunit assembly of rocket units is formed by connecting two or three side rocket units to the central rocket unit. At lift-off the cruise LRESs of the side and central rocket units are fired and they are brought to the nominal thrust mode. In a non-emergency situation the cruise LRESs of the side and central rocket units work together in the nominal thrust mode until the side rocket units are separated from the central, wherein the LRES of the central rocket unit works on a propellant supplied from tanks of the side rocket units. When the propellant from the side rocket units is consumed, the latter units are jettisoned, and the LRES of the central rocket unit continues to operate, using the propellant of the central rocket unit. The launch vehicle contains a lower multiunit assembly of rocket units with multiengine cruise LRESs, the assembly including a central and connected thereto side rocket units, and an acceleration rocket unit and a head unit with the payload tandem secured on the central rocket unit. The launch vehicle is provided with a system for pumping propellant between the side rocket units and the central rocket unit. It is presumed that the construction of the launch vehicle described in the patent and the method for placing the payload into a near-earth orbit ensures guaranteed placement of the payload into the orbit when a multiengine cruise LRES is used, even if there is failure of one of the engines or the whole LRES of the central or one of the side rocket units, as a result of rational use of reserves of the propellant of the central rocket unit and the side rocket units in the cruise LRES engines which have retained their working capacity. In this invention, an increased time of operation of the cruise LRES of the central rocket unit is provided as a result of its operation during the first stage on propellant fed from the side rocket units, which results in a reduction of the reliability of placing the payload into orbit, since there is a high probability that a defect in the propellant pumping system will appear, especially in the detachable connections of the pipelines between the rocket units. Another drawback of this invention is that it is impossible to standardize the side units and the central unit, since it is necessary to provide them with a different number of pumping devices, which makes the refinement of the launch vehicle more complex, since the units for each assembly need to be refined separately.

The method most similar to the claimed method in respect to the combination of material features is the method for placing a payload into orbit by a multifunctional launch vehicle of a combined scheme with cruise LRESs, which has been realized in the Soviet Union with use of the launch vehicle "Vostok," which is used to place manned and unmanned space ships with a mass up to 5 tons in a near-earth orbit (see, for example, Launch Vehicles, V. A. Aleksandrov, V. V. Vladimirov, R. D. Dmitriev, S. O. Osipov, Senior Editor Prof. S. O. Osipov, Moscow, Voenizdat, 1981, pp. 19–22, FIG. 1.2). The known method includes connecting tandem positioned acceleration rocket units and a head unit with a payload to a central rocket unit in accordance with the launch program and forming a lower multiunit assembly, of rocket units by connecting side rocket units to the central rocket unit, firing at lift-off all the cruise LRESs of the side rocket units and the central rocket unit, jointly operating the cruise LRESs of the central rocket unit and the side rocket units until the propellant of the side rocket units is consumed, cutting off the cruise LRESs of the side rocket units and separating the side rocket units from the central rocket unit while continuing operation of the cruise LRES of the central rocket unit until the propellant therein is consumed, cutting off the cruise LRES of the central rocket unit, separating the tandem positioned acceleration rocket unit and the head unit from the central rocket unit and subsequently accelerating the head unit until its placement into orbit.

The launch vehicle "Vostok" itself comprises a lower multiunit assembly of rocket units with cruise LRESs, which work on kerosene and liquid oxygen and have a significantly less effect on ecology as compared with the SPREs used in the "Ariane-5" project. The lower multiunit assembly of rocket units includes a central and connected thereto four side rocket units. A transition compartment, an acceleration rocket unit and a head unit with a payload are secured in tandem on the central unit. The launch vehicle is provided with a system for securing the side rocket units to the central unit. The side rocket units are provided with head domes. The central rocket unit has a large size and large mass as compared with the side rocket units and carries more propellant in its tanks, which ensures more lengthy operation of its cruise LRES. The cruise LRES of the central rocket unit has an immovably secured four-chamber main rocket engine and four steering rocket engines. The LRES of each side rocket unit has an immovably secured four-chamber main rocket engine and two steering rocket engines. Thus, the lower multiunit assembly of rocket units of the launch vehicle "Vostok" is assembled of nonidentical rocket units. The refinement of the launch vehicle "Vostok" included selection of the size-mass characteristics of the central rocket unit, side and acceleration rocket units and thrust characteristics of their cruise LRESs, designing and manufacturing the aforesaid rocket units, forming therefrom the lower multiunit assembly of rocket units, ground-based and flight-structural tests to confirm the reliability of both separate rocket units and the launch vehicle as a whole. As in respect to the launch vehicle "Ariane-5," during the refinement of the launch vehicle "Vostok," separate refinement of the central rocket unit and the side rocket units is necessary with subsequent testing in assembly, which occupies a lot of time and requires large expenditures. Furthermore, operation of the launch vehicle "Vostok" is possible only after refinement of the arrangement of the central rocket unit and the side rocket units.

It is clear from the foregoing that the necessity exists for improvement of the method for placing a payload into orbit and an expendable launch vehicle with a changeable assembly, which would ensure the delivery into different near-earth orbits of devices of different mass and purpose with the simultaneous reduction of the cost of placing the payload and the reduction of the time necessary to develop a launch vehicle.

The object to the achievement of which the claimed invention is directed is to create a method for placing a payload into orbit by a multifunctional launch vehicle of a combined scheme with cruise LRESs and the launch vehicle itself, which ensure an expanded range of change of the mass of the payload being placed into orbit with a minimum number of varieties (types) of rocket units which are included in the assembly of the launch vehicle. Another object to the achievement of which the claimed invention is directed is to create a method for placing a payload into orbit by a multifunctional launch vehicle of a combined scheme with cruise LRESs and the launch vehicle itself, ensuring a minimum change of the coordinates of descent of the spent side rocket units when devices of different mass and purpose are placed into a near-earth orbit and accordingly a reduction of the dimensions of the closed zone for the field of fall of spent rocket units.

An additional object of the invention is to create a method for placing a payload into orbit by a multifunctional launch vehicle of a combined scheme with cruise LRESs, which ensures reduction of both inertial and aerodynamic loads on the launch vehicle during flight.

Another object of the invention is to create a launch vehicle of combined scheme with cruise LRESs, which ensures a reduction of the expenditures on its development and on its production as a result of the use of a minimum number of versions (types) of rocket units included in the assembly of the launch vehicle and the increase of their mass production.

One more object of the invention is to create a launch vehicle of a combined scheme with cruise LRESs and a method for its refinement, which provide a reduction of the expenditures on the development of the launch vehicle and the possibility of starting its operation in a lighter version at the earliest stages of development.

DISCLOSURE OF THE INVENTION

The technical objects indicated above are achieved in that in the known method for placing a payload into orbit by a multifunctional launch vehicle of a combined scheme with cruise liquid rocket engine systems (LRESs), including connecting tandem positioned acceleration rocket units and a head unit with a payload to a central rocket unit in accordance with the launch program and forming a lower multiunit assembly of rocket units by connecting side rocket units to the central rocket unit, firing all the cruise LRESs of the side rocket units and the central rocket unit at lift-off, jointly operating the cruise LRESs of the central rocket unit and the side rocket units until the propellant of the side rocket units is consumed, cutting off the cruise LRESs of the side rocket units and separating the side rocket units from the central rocket unit while continuing operation of the cruise LRES of the central rocket unit until the propellant therein is consumed, cutting off the cruise LRES of the central rocket unit, separating the tandem positioned rocket units and head unit from the central rocket unit and subsequently accelerating the head unit by the aforesaid rocket units until its placement into orbit, in accordance with the invention, identical rocket units having adjustable cruise LRESs with an identical nominal thrust are used to form the lower multiunit assembly of rocket units, at lift-off the launch vehicle is made to ascend by cruise LRESs of the side rocket units at a nominal thrust, and the cruise LRES of the central rocket unit—at a thrust equal to 90–100% of the nominal value, and it is kept constant until the launch vehicle reaches a longitudinal acceleration of 12.7–16.7 m/sec² (1.3–1.7 g), then the thrust of the cruise LRES of the central rocket unit is reduced to 0.3–0.5 of the nominal thrust, and after the cruise LRESs of the side rocket units are cut off, the thrust of the cruise LRES of the central unit is increased to the nominal value.

Furthermore, during operation of the launch vehicle with a lower level of the thrust of the cruise LRES of the central rocket unit, when it reaches the longitudinal acceleration of 39–44 m/sec² (4–4.5 g), the thrust of the cruise LRESs of the side rocket units is smoothly reduced, maintaining the aforesaid longitudinal acceleration until termination of operation of the LRESs of the side rocket units.

Furthermore, during the atmosphere portion of the path, the altitude of the flight of the launch vehicle and its velocity are measured, on the basis of which the dynamic pressure of the oncoming air flow at the density of a standard atmosphere at flight altitude is determined, and when the launch vehicle reaches the velocity at which the aerodynamic forces from the dynamic pressure of the oncoming air flow reach the values which are maximum permissible for the construction of the launch vehicle, further increase of the velocity of the launch vehicle is carried out by adjustment of the thrust of the cruise LRESs of the side rocket units within the limits of 0.3–1.0 of the nominal thrust under condition that the maximum permissible dynamic pressure is not exceeded, maintaining the relationship:

$$V_i = kV_1 \sqrt{\frac{\rho_1}{\rho_i}} \quad (1)$$

wherein:
$V_i$ is the current velocity of the launch vehicle;
k is a dynamic coefficient equal to 0.95–1.05;
$V_1$ is the velocity of the launch vehicle at which the maximum permissible dynamic pressure is reached;
$\rho_1$ is the density of standard atmosphere, at which the maximum permissible dynamic pressure is reached;
$\rho_i$ is the current density of standard atmosphere at the flight altitude.

Wherein, the adjustment of the thrust of the cruise LRESs of the side rocket units is carried out under the condition that the maximum permissible dynamic pressure, equal to 12000–17000 Pa, is not exceeded.

As applied to a multifunctional launch vehicle of a combined scheme with cruise LRESs, the stated object is achieved in a launch vehicle comprising a lower multiunit assembly of rocket units with cruise LRESs, including a central and connected thereto side rocket units and tandem secured on the central unit a transition compartment, acceleration rocket units and a head unit with a payload, head domes of side rocket units, and a system for securing the side rocket units to the central unit, in that in accordance with the invention, the lower multiunit assembly is composed of identical rocket units having identical propellant tanks and identical cruise LRESs with adjustable thrusts secured in a gimbal suspension, the side rocket units are mounted on the central rocket unit symmetrically relative to its longitudinal axis in sectors formed by swinging, planes of the cruise LRES of the central rocket unit so that the swinging planes of the cruise LRES of each side rocket unit are parallel to corresponding swinging planes of the cruise LRES of the central rocket unit.

The launch vehicle may be provided with two side rocket units, which are mounted on the central rocket unit in one plane that is oriented at an angle of 45° to one of the swinging planes of the cruise LRES of the central rocket unit, or with four side rocket units mounted on the central rocket unit in two mutually perpendicular planes, oriented at an angle of 45° to the swinging planes of the cruise LRES of the central rocket unit.

As applied to a method of refining a multifunctional launch vehicle of a combined scheme with cruise LRESs, the stated object is achieved in that in a method for optimizing, including selecting the size-mass characteristics of the central, side and acceleration rocket units and the thrust characteristics of their cruise LRESs, designing and manufacturing the aforesaid rocket units, forming therefrom a lower multiunit assembly of rocket units, conducting ground-based and flight-structural tests to confirm the reliability of both separate rocket units and the launch vehicle as a whole, in accordance with the invention, identical size-mass characteristics and thrust of the cruise LRESs are set for the central rocket unit and the side rocket units, this ensuring use of the central rocket unit in the makeup of a launch vehicle of a tandem scheme with a monounit lower stage, the aforesaid rocket unit is produced and ground-based and flight structural tests thereof are carried out, including in the makeup of the launch vehicle of the tandem scheme, reliability of the central rocket unit is confirmed and the central rocket unit refined on a launch vehicle of a tandem scheme is used when forming the lower multiunit assembly of rocket units of the launch vehicle of a combined scheme with the conduction of flight-structural tests with an increased time of operation of the cruise LRES of the central rocket unit relative to the cruise LRESs of the side rocket units.

The essence of the invention is that forming in the launch vehicle of a combined scheme the lower multiunit assembly of identical rocket units having identical fuel tanks and identical cruise LRESs, it is possible to expand the range of changing the mass of the payload placed in a near-earth orbit by simply increasing the side rocket units connected to the central rocket unit. Wherein, as compared with known realized schemes for placement of a payload by combined launch vehicles, in the claimed method it is possible to significantly reduce the expenditures on placing the payload into orbit as a result of using monotype standardized constructions. Using adjustable cruise LRESs in the aforesaid rocket units makes it possible at lift-off to fully realize the energetic possibilities of the lower multiunit assembly of rocket units, and subsequent reduction of the thrust of a cruise LRES of the central rocket unit to 0.3–0.5 of the nominal thrust guarantees that there is a reserve of propellant in the central rocket unit for its cruise LRES after separation of the side rocket units. A decrease of the thrust of the cruise LRES of the central rocket unit begins after a longitudinal acceleration of 12.7–16.7 m/sec² (1.3–1.7 g) has been reached by the launch vehicle, this acceleration ensuring a stable position of the launch vehicle in its path. An increase of the thrust of the cruise LRES of the central rocket unit to the nominal value after the cruise LRESs of the side rocket units are cut off makes it possible to fully use the energetic possibilities of the central rocket unit.

A smooth reduction of the thrust of the cruise LRESs of the side rocket units when the launch vehicle reaches a longitudinal acceleration of 39–44 m/sec² (4–4.5 g) with the maintenance of this longitudinal acceleration until teinination of operation of the side rocket units ensures expansion of the range of the mass of the payload placed into orbit, since it provides the possibility of avoiding redundant overloads when a payload with reduced mass is being placed into orbit. Wherein, it is also possible to achieve a minimum change of the coordinates of the fall of spent side rocket units and accordingly—reduction of the closed zone.

The proposed method makes it possible to limit the action on the launch vehicle of aerodynamic forces from the dynamic pressure of the oncoming air flow. In order to do this, when the maximum permissible dynamic pressure on the construction of the launch vehicle is reached, a further increase of the velocity is carried out by adjusting the thrust of the cruise LRESs of the side rocket units within the range of 0.3–1.0 of the nominal thrust under the condition that the maximum permissible dynamic pressure is not exceeded, maintaining the indicated relationship (I).

A dynamic pressure of the oncoming air flow, which does not exceed 12000–17000 Pa, is the optimum dynamic pressure for the construction of a launch vehicle of combined scheme.

Securing the cruise LRESs of the central rocket unit and the side rocket units in a gimbal suspension and mounting the side rocket units on the central rocket unit symmetrically relative to its longitudinal axis in sectors which are formed by swinging planes of the cruise LRES of the central rocket unit, so that the swinging planes of the cruise LRES of each side rocket unit are parallel to corresponding swinging planes of the cruise LRES of the central rocket unit, ensures an identical positioning of each side rocket unit and its cruise LRES relative to the central rocket unit and its cruise LRES independent of the number of side rocket units included in the launch vehicle assembly, which makes it possible to use identical rocket units in the makeup of the launch vehicle with a standardized system for control of each side rocket unit.

When two or four side rocket units are secured on the central rocket unit with their arrangement in planes oriented at an angle of 45° to the swinging planes of the cruise LRES of the central rocket unit, identicalness of the conditions of their operation is ensured independent of the number of side rocket units in the lower multiunit assembly.

The proposed method for placing a payload in orbit by a multifunctional launch vehicle of a combined scheme with cruise LRESs and the construction of the launch vehicle provide the possibility of reducing the cost of development of the launch vehicle and to begin its operation at the very earliest stages of development, since in the proposed method of refinement, during the selection of the size-mass characteristics of the central, side and acceleration rocket units and the thrust characteristics of their cruise LRESs, identical size-mass characteristics and thrust of the cruise LRESs are prescribed for the central and side rocket units. This provides the possibility of using the central rocket unit in the makeup of a launch vehicle of a tandem scheme with a monounit lower stage, which makes it possible after the central rocket unit has been manufactured and ground-based and flight-structural tests have been carried out to begin to use it within the makeup of a launch vehicle of a tandem scheme. After ascertaining the reliability of the central rocket unit in this manner, the lower multiunit assembly of rocket units of the launch vehicle of a combined scheme is formed and flight-construction tests are carried out with a greater time of operation of the cruise LRES of the central rocket unit relative to the cruise LRESs of the side rocket units.

The technical result from use of the proposed invention is the expansion of the range of change of the mass of the payload being placed in a near-earth orbit, in particular, the launch vehicle of a combined scheme being developed within the "Angara" project provides the possibility of rocketing a payload of from 14 tons to 28.5 tons. The use of the central rocket unit, being developed in the "Angara" project, as a lower stage of a launch vehicle of a tandem scheme with placement of a payload with a mass of from 2 tons to 3.7 tons into a near-earth orbit is also possible.

DETAILED DESCRIPTION

Figure 1:
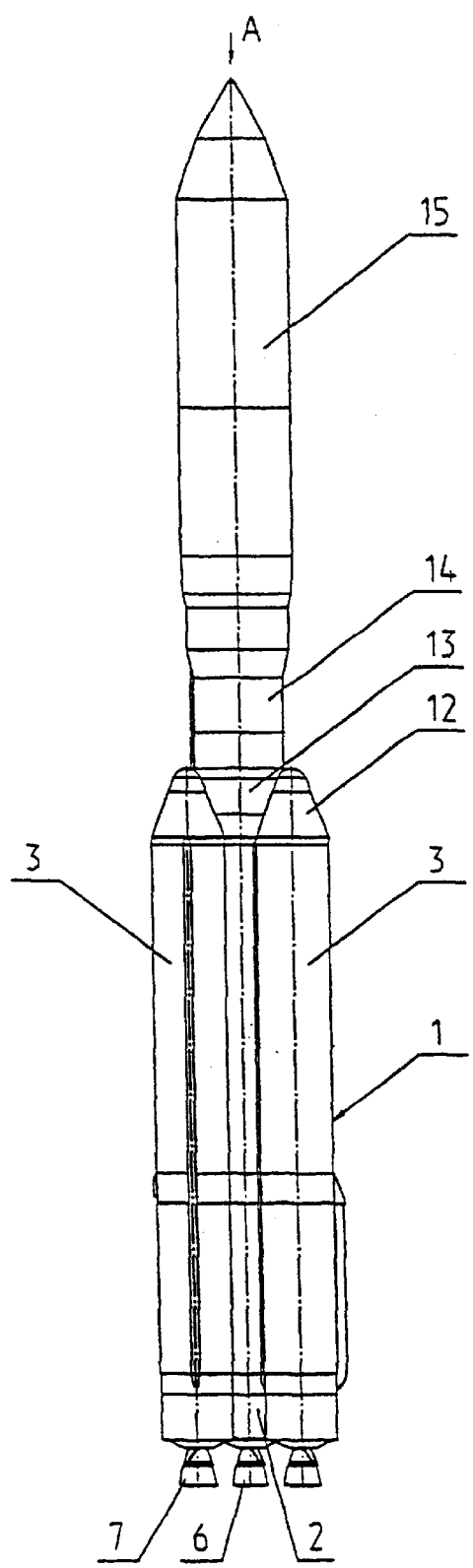
FIG. 1 shows the general view of the proposed launch vehicle, heavy class.
Figure 2:
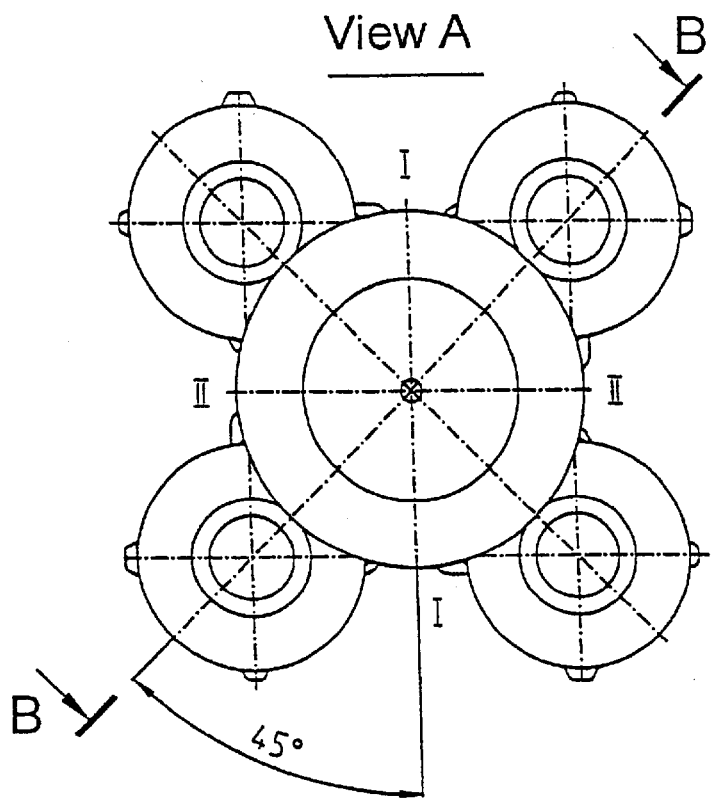
FIG. 2 shows view A in FIG. 1.

A heavy-class launch vehicle comprises a lower multiunit assembly 1 of rocket units, including a central rocket unit 2 and connected thereto four side rocket units 3. The lower multiunit assembly is composed of identical rocket units, which have identical propellant tanks 4 and 5. The propellant tank 4 of each rocket unit 2 and 3 has a volume of 46 $m^3$ and holds up to 36.5 tons of hydrocarbon fuel. The propellant tank 5 of each rocket unit 2 and 3 has a volume of 90 $m^3$ and holds up to 96 tons of liquid oxygen. The central rocket unit 2 is provided with an adjustable cruise LRES 6 with a nominal thrust of 196 tons (1920 kN) and a minimum thrust of 58 tons. The side rocket units 3 are provided with adjustable cruise LRESs 7. The cruise LRESs 7 are completely identical to the LRES 6 of the central rocket unit 2 and their thrust may also be adjusted within the range of from 58 tons to 196 tons. The central and side rocket units are provided with reactive systems for roll control (not shown in the drawing). The cruise LRES 6 of the central rocket unit is secured in a gimbal suspension 8 with two mutually perpendicular swiveling axes, making it possible for the LRES 6 to swing in two planes I—I and II—II. The swinging planes divide the central unit 2 into four vertical sectors. The side rocket units 3 are mounted on the central rocket unit 2 symmetrically relative to its longitudinal axis in the aforesaid vertical sectors in two mutually perpendicular planes III—III and IV—IV, oriented at an angle of 45° to the swinging planes of the cruise LRES 6 of the central rocket unit.

Figure 4:
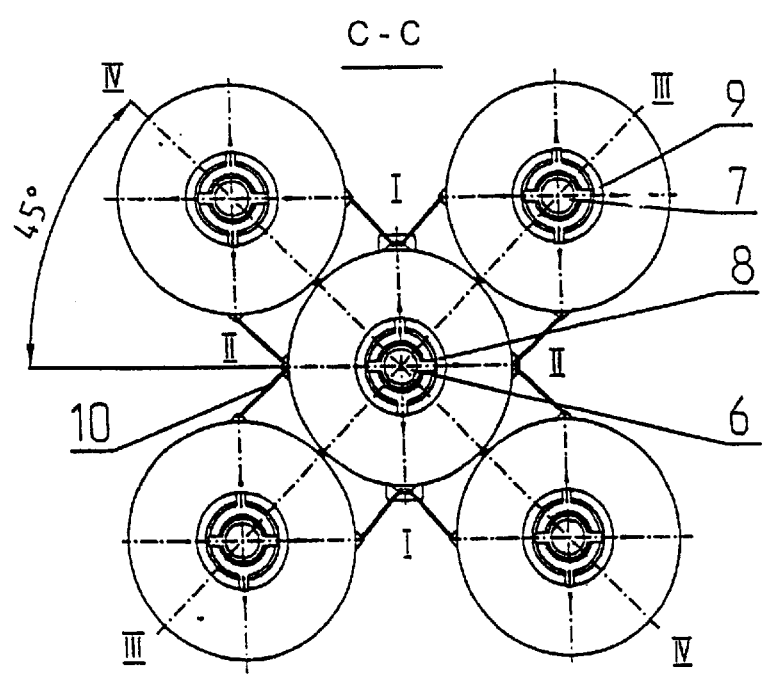
FIG. 4 shows the section c—c in FIG. 3.
Figure 3:
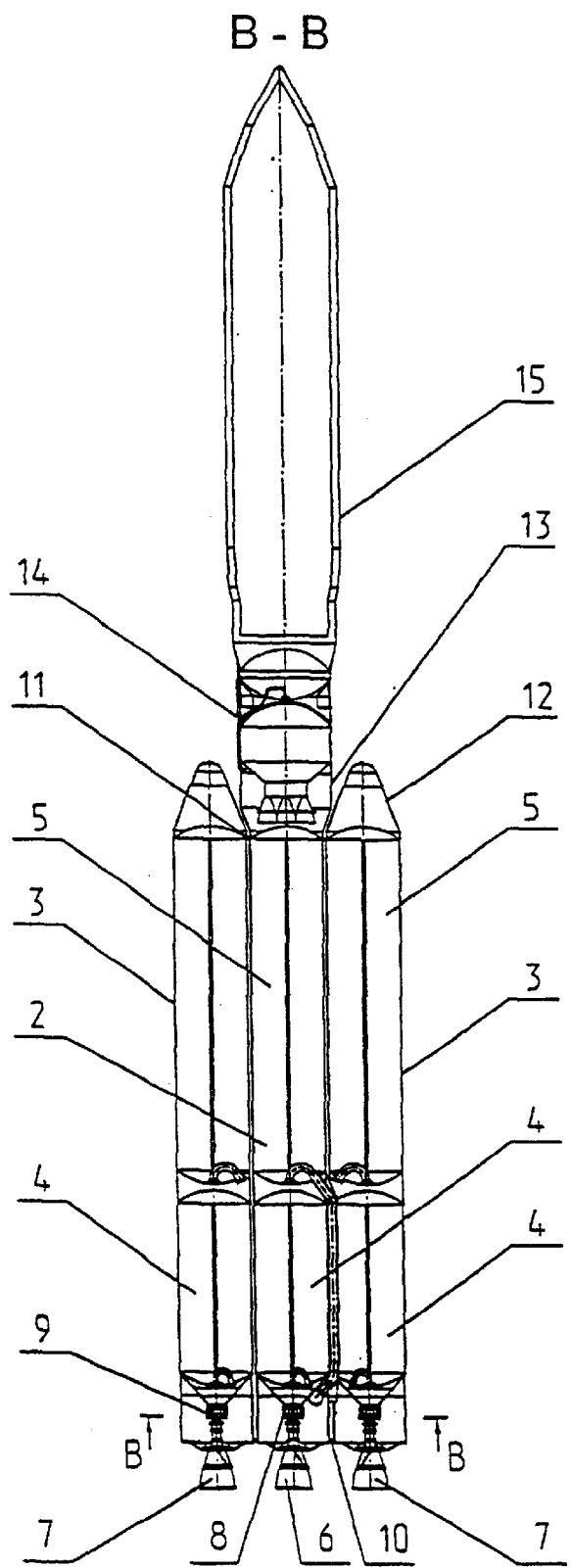
FIG. 3 shows the section B—B in FIG. 2.

The cruise LRESs 7 of the side rocket units are secured in gimbal suspensions 9 with two mutually perpendicular swiveling axes, making it possible for the LRESs 7 to swing in two planes, similar to the cruise LRES 6 of the central rocket unit. The swinging planes of the cruise LRESs 7 of the side rocket units are parallel to corresponding swinging planes of the cruise LRES 6 of the central rocket unit. The gimbal suspensions 8 and 9 are shown in FIG. 4 schematically, since their construction is not the subject of the invention according to the instant application and may use constructions of LRES gimbal suspensions, which are known in rocket engineering.

The system for securing the side rocket units includes hinge power joints for fixing the side rocket units relative to the central rocket unit, which joints are positioned in lower 10 and upper 11 girders. The construction of the fixation units is not given consideration in the instant application. The side rocket units are provided with head domes 12. A transition compartment 13, an acceleration rocket unit 14 and a head unit 15, in which the payload with a mass of 24.5–28.5 tons to be placed into near-earth orbit is arranged, are secured in tandem on the central rocket unit.

Figure 5:
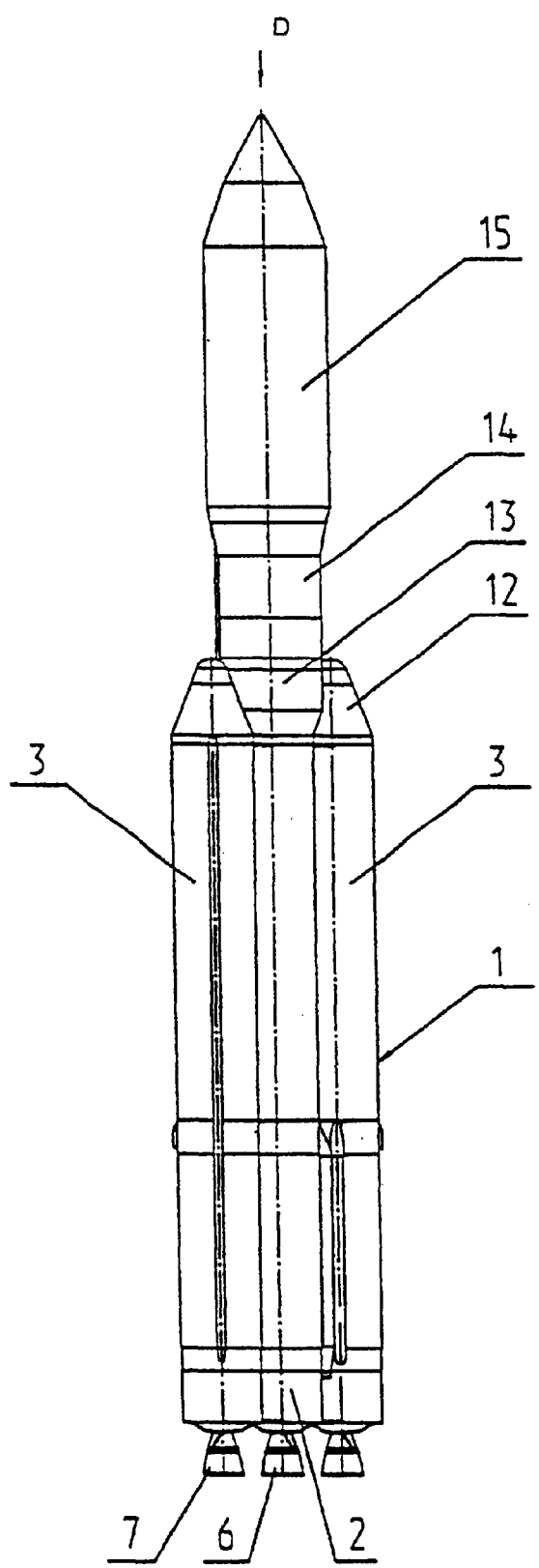
FIG. 5 shows the general view of the proposed launch vehicle, middle class.
Figure 6:
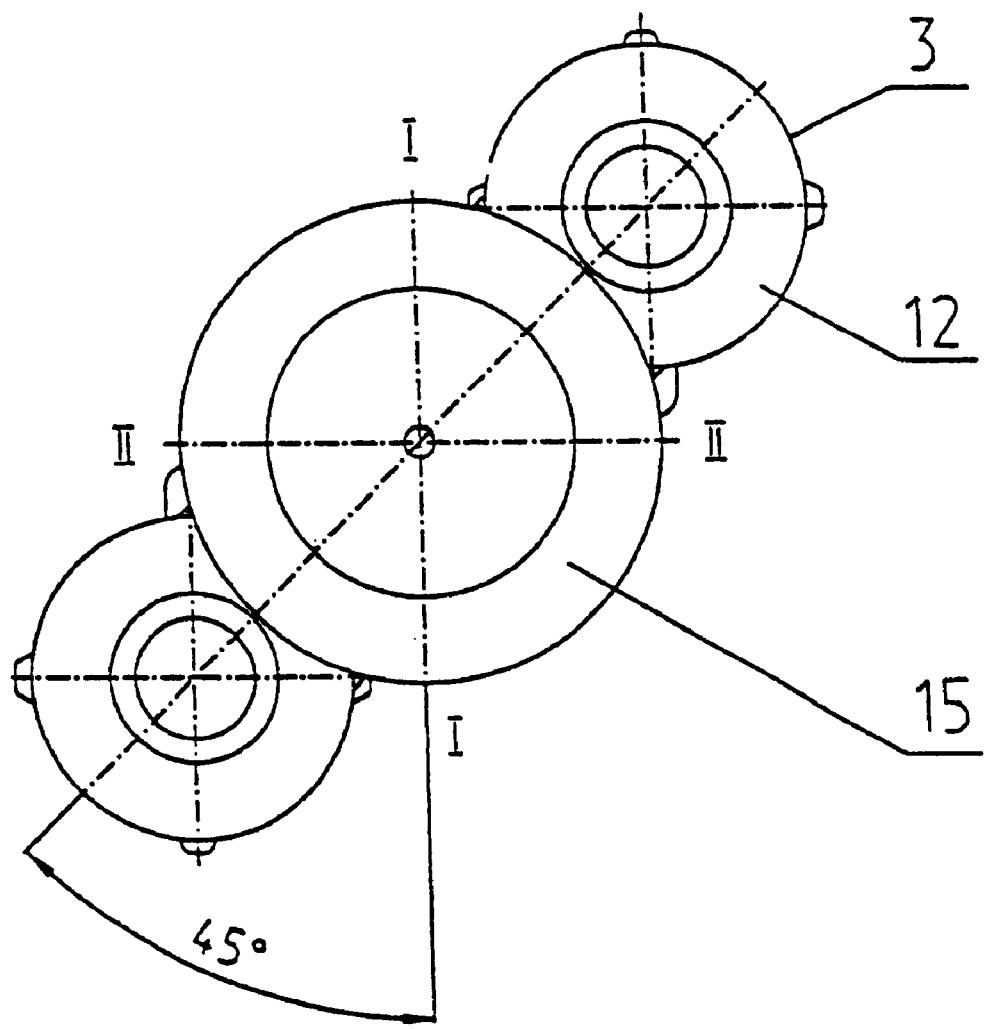
FIG. 6 shows view D in FIG. 5.

The proposed invention makes it possible, using a standardized central rocket unit, to assemble a middle class launch vehicle of a combined scheme as shown in FIGS. 5 and 6. The middle class launch vehicle comprises a lower multiunit assembly 1 of rocket units, the assembly including a central rocket unit 2 and connected thereto two side rocket units 3. The central and side rocket units of this rocket in respect to construction and dimensions are completely identical to the rocket units of the heavy class launch vehicle and use the same adjustable cruise LRESs with the thrust changed from 58 tons to 196 tons. The side rocket units 3 are mounted on the central rocket unit symmetrically relative to its longitudinal axis and are positioned in one plane oriented at an angle of 45° to the swinging plane of the cruise LRES of the central rocket unit.

Figure 7:
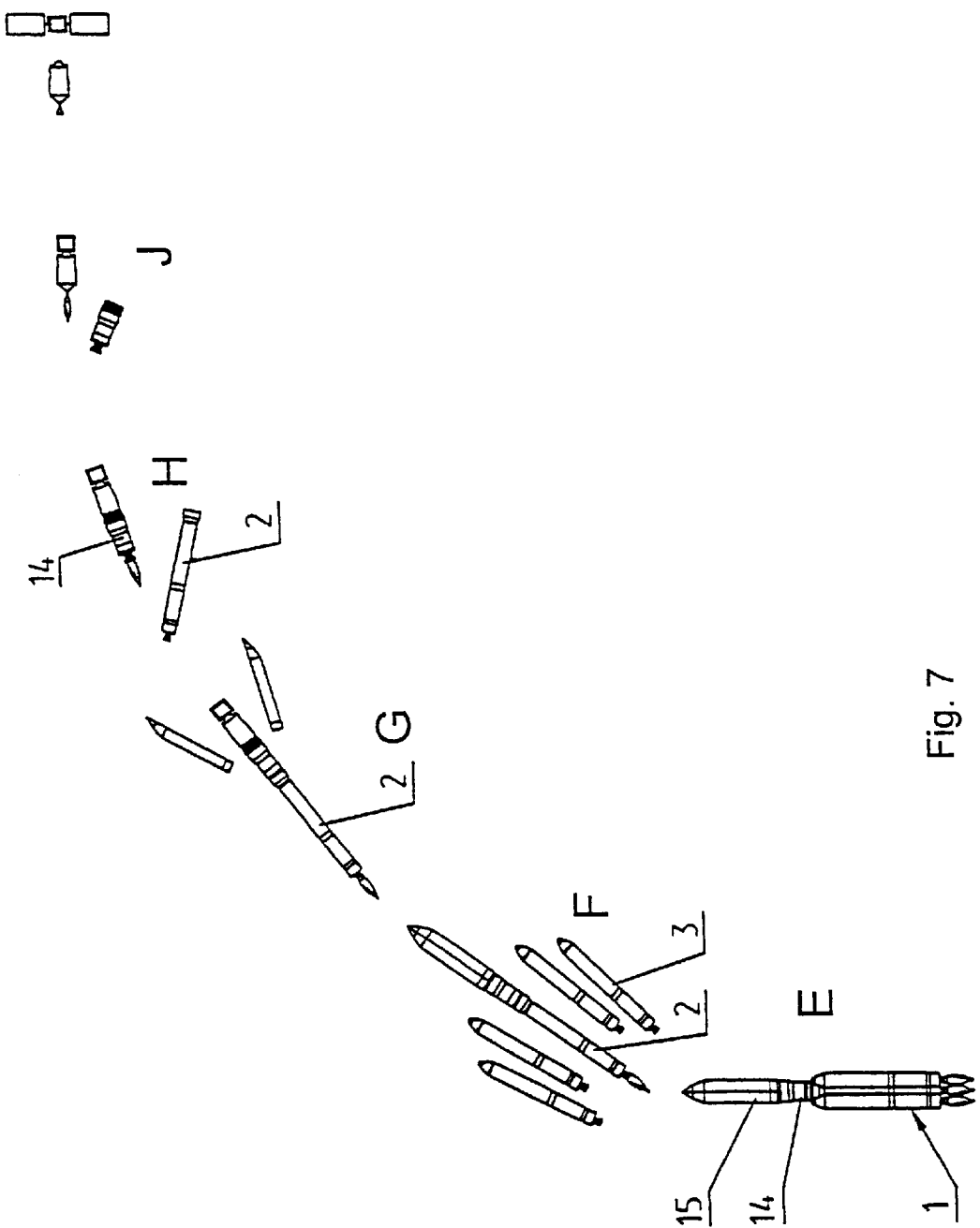
FIG. 7 shows a scheme for placing a payload into orbit.

As an example of realization of the method, consideration will be given to the placement of a payload with a mass of 26–28 tons into a near-earth orbit with the aid of a heavy-class launch vehicle. The sequence of the steps of placing the payload with the aid of a launch vehicle of combined scheme, shown in FIG. 7, includes:

launching the launch vehicle with simultaneous operation of the cruise LRESs of the central and the side rocket units (position E);

separating exhausted side rocket units from the central rocket unit (position F);

accelerating the launch vehicle with the aid of the cruise LRES of the central rocket unit (position G). At this step, the dome of the head unit is cast off;

firing the cruise LRES of the acceleration unit and separating it from the central rocket unit (position H);

moving the payload into orbit with the aid of the LRES of the head unit (position J).

In accordance with the launch program, the lower multiunit assembly 1 of rocket units is formed, connecting four side rocket units 3 to the central rocket unit 2. An acceleration rocket unit 14 with a cruise LRES having a thrust of 30 tons (294 kN) and a head unit 15 with the payload are also connected to the central rocket unit.

Figure 8:
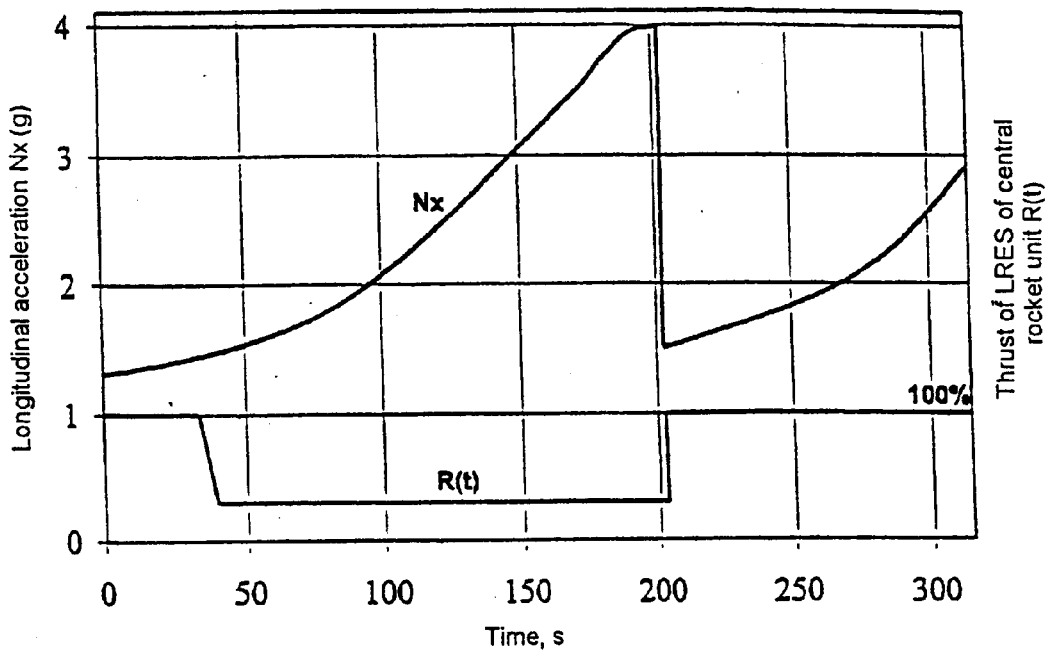
FIG. 8 shows a graph of change of the thrust of a cruise LRES of the central rocket unit.

At the lift-off, the cruise LRESs 6 and 7 of the central and side rocket units are fired and each of them is brought to the nominal thrust of 196 tons, obtaining a sum thrust at lift-off of 980 tons. Acceleration is begun with the launch vehicle in a vertical position until a stable position of the launch vehicle is reached on the path, after which a turn in the vertical plane begins. When a longitudinal acceleration of 14.7 m/sec$^2$ (1.5 g) is reached, the thrust of the cruise LRES 6 of the central rocket unit begins to decrease and it is reduced to 58 tons (570 kN). Further acceleration of the launch vehicle is carried out at a constant thrust of 58 tons of the cruise LRES 6 of the central rocket unit right up to burnout of the propellant from the tanks of the side rocket units and cut-off of their cruise LRESs 7. This provides the possibility at the moment of cutting off the cruise LRESs 7 of the side rocket units to retain in the tanks of the central rocket unit up to 18 tons of hydrocarbon fuel and up to 49 tons of liquid oxygen, which is sufficient to deliver the payload into a near-earth orbit. After the cruise LRESs 7 of the side rocket units are cut off, the thrust of the cruise LRES 6 of the central rocket unit is increased to the nominal value of 196 tons, while the exhausted side rocket units are separated from the central rocket unit and acceleration of the launch vehicle is continued during operation of the LRES of the central rocket unit at the nominal thrust right up to burnout of the propellant from the tanks of the central rocket unit. A typical graph of change of the thrust $R_t$ of the cruise LRES of the central rocket unit is shown in FIG. 8 in which a change of the longitudinal acceleration $N_x$ of the launch vehicle is also shown. After cutoff of the cruise LRES 6 of the central rocket unit, the latter is cast off, the LRES of the acceleration rocket unit 14 is fired and further placement of the payload into orbit is carried out by the cruise LRES of the acceleration unit and, where necessary, by the rocket engine itself of the head unit 15.

Figure 9:
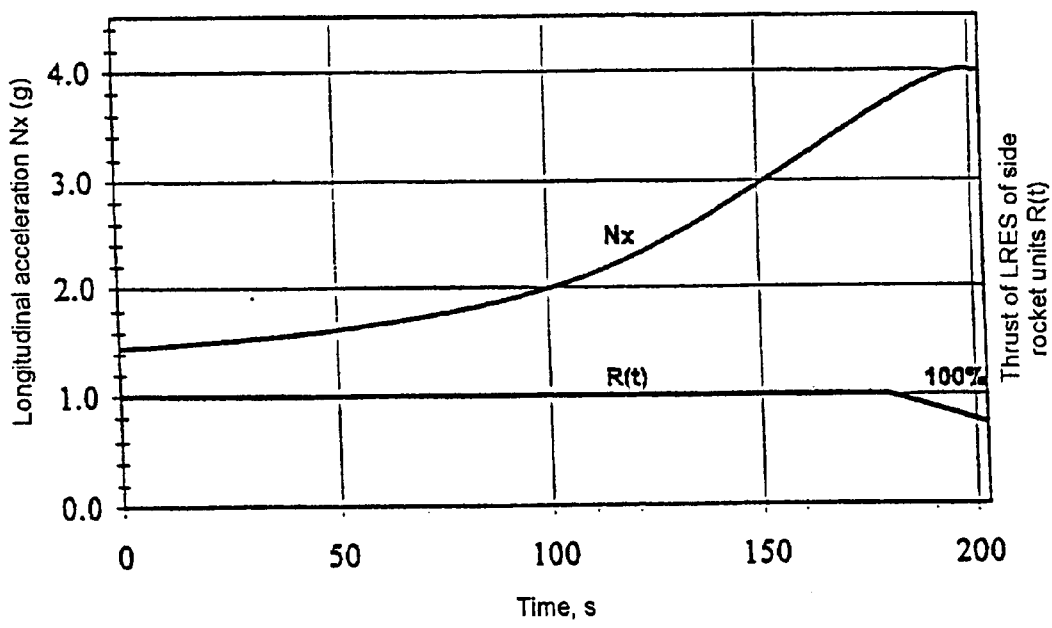
FIG. 9 shows a graph of change of the thrust of a cruise LRES of a side rocket unit with control of an inertial load.

During the placement of a payload with a mass of 23–24 tons into a near-earth orbit by a heavy-class launch vehicle, the necessity arises to control the cruise LRESs of the side rocket units in order to reduce the inertial loads on both the construction of the launch vehicle and on the payload. In order to solve this problem during the operation of a launch vehicle with a thrust level of the cruise LRES of the central rocket unit equal to 58 tons, when it reaches its longitudinal acceleration of 39–44 M/sec$^2$ (4–4.5 g), the thrust of the cruise LRESs 7 of the side rocket units is uniformly reduced, maintaining the aforesaid longitudinal acceleration until the end of operation of the LRESs of the side rocket units. The cruise LRESs 7 of the side rocket units make it possible to adjust the thrust within the range of 30–100% of the nominal value of a similar cruise LRES 6 of the central rocket unit. A typical graph of chance of the thrust $R_t$ of the cruise LRESs 7 of the side rocket units when the maximum permissible value of the longitudinal acceleration $N_x$ is reached is shown in FIG. 9.

Adjustment of the thrust of cruise LRESs of the central and side rocket units also provides the possibility to ensure selection of the area of fall of exhaust side and central rocket units, since it makes it possible, controlling the thrust of the cruise LRESs of these units to widen the variation of kinematic parameters of the launch vehicle at the moments of separating the side and central rocket units.

Figure 10:
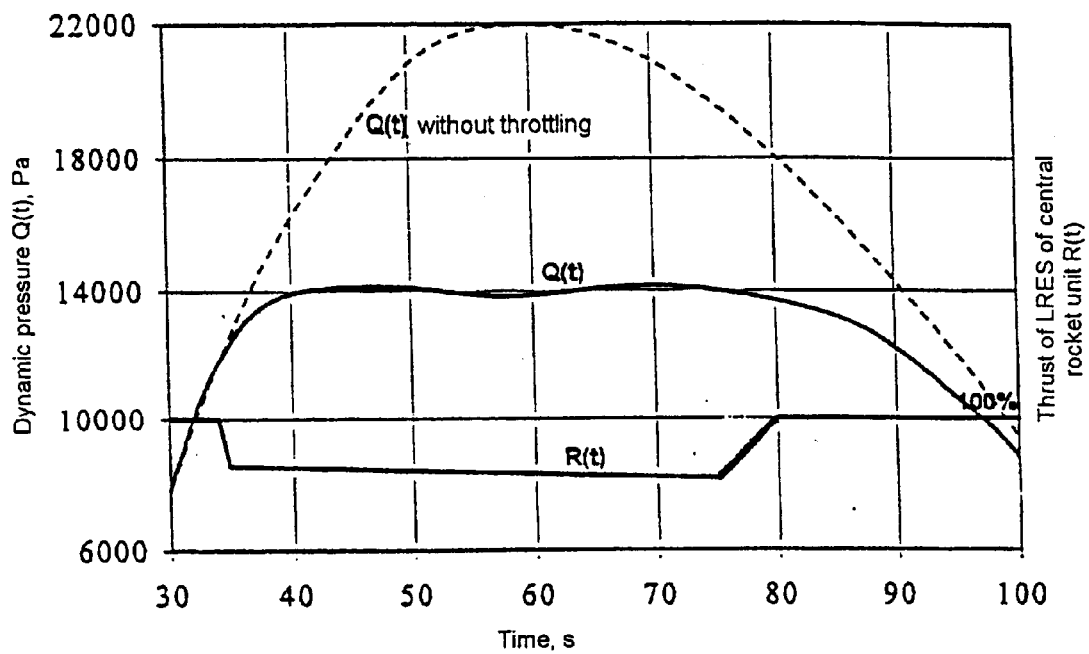
FIG. 10 shows a graph of a change of the thrust of a cruise LRES of a side rocket unit with control of an aerodynamic load.

The necessity for adjustment of the aerodynamic loads acting on the construction of the launch vehicle may arise in the atmosphere portion of the path. In order to do this the altitude of the flight of the launch vehicle and its velocity are measured, in accordance with which the dynamic pressure $Q_t$ of the oncoming air flow at the density of a standard atmosphere at the flight altitude is determined. When the launch vehicle reaches a velocity at which the aerodynamic forces from the dynamic pressure of the oncoming air flow reach the maximum permissible values for the construction of the launch vehicle, further increase of the velocity of the launch vehicle is accomplished by adjustment of the thrust of the cruise LRESs of the side rocket units within the range of 0.3–1.0 of the nominal thrust under condition that the maximum permissible dynamic pressure is not exceeded, maintaining the relationship (1). In the case of the launch vehicle being given consideration as an example, the maximum permissible dynamic pressure should not exceed 13000–15000 Pa. A typical graph of change of the thrust $R_t$ of the cruise LRESs 7 of the side rocket units when adjustment of the aerodynamic load acting on the construction of the launch vehicle is made is shown in FIG. 10. The change of the dynamic pressure of the oncoming air flow in the absence of adjustment of the velocity of the launch vehicle is shown by the dashed line in FIG. 10. A limitation of the dynamic pressure of the oncoming air flow acting on the construction of the launch vehicle provides the possibility of increasing the mass of the payload being placed into near-earth orbit.

Refinement of the launch vehicle is accomplished in the following manner. The size-mass characteristics of the central, side and acceleration rocket units and the thrust characteristics of their cruise LRESs are selected, wherein identical size-mass characteristics and thrust of the cruise LRESs, ensuring the use of the central rocket unit in the makeup of the tandem scheme launch vehicle with a monounit lower stage, are defined for the central and the side rocket units. In the variant of a combined launch vehicle of heavy and middle class under consideration, the following parameters were taken for the central rocket unit:

thrust of the cruise LRES—196 tons;

diameter—2.9 m;

length (from the upper bottom of the oxidizer tank to the nozzle exit section)—25 m;

takeoff mass with filled oxidizer and fuel tanks—142 tons.

These parameters make it possible to use the central rocket unit in a launch vehicle of a tandem scheme as its lower stage to place a payload with a mass of from 2 tons to 3.7 tons into a near-earth orbit.

Similar characteristics were set for the side rocket units. The characteristics of the acceleration and head units were set on the basis of the mass of the payload.

Figure 11:
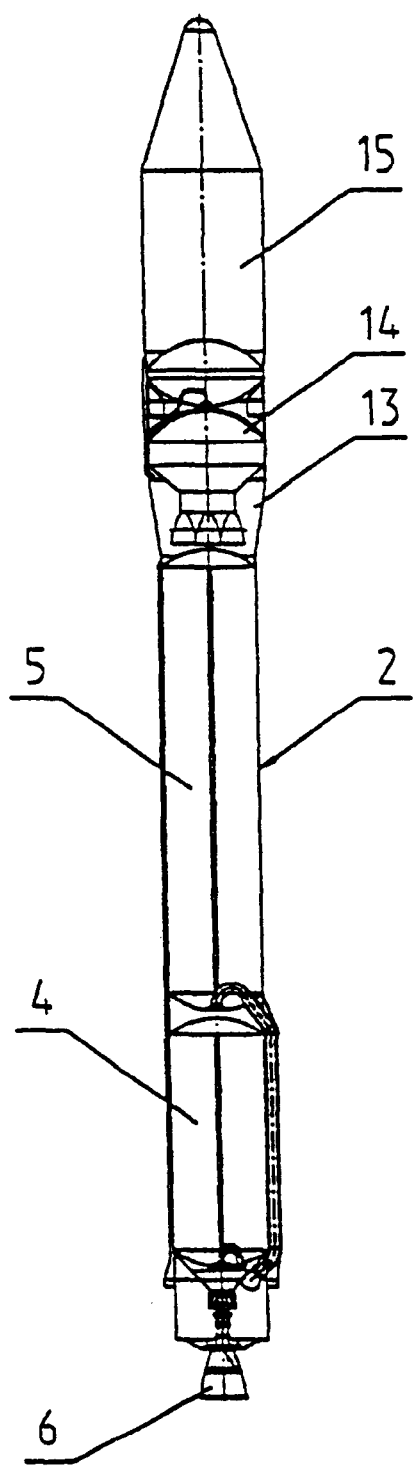
FIG. 11 shows a launch vehicle of a tandem scheme, in which a central rocket unit is used as the first stage.

The aforesaid rocket units are designed and produced and their ground-based and flight-structural tests are carried out. The central rocket unit is tested in the makeup of a launch vehicle of a tandem scheme and its use begins in a launch vehicle of a light-class tandem scheme to place payloads of from 2 tons to 3.7 tons into a near-earth orbit (FIG. 11). This makes it possible to rapidly obtain statistic data in order to confirm the reliability of a produced rocket unit and to reduce expenditures on the refinement of a combined launch vehicle, since both experimental and operating launches of the rocket unit will be taken into account in the statistics. The rocket unit which has been refined on a launch vehicle of a tandem scheme is used during the formation of the lower multiunit of an assembly of rocket units of a launch vehicle of a combined scheme, variants of which are shown in FIG. 1 and FIG. 5. Flight-structural tests are carried out with an increased time of operation of the cruise LRES of the central rocket unit as compared with the cruise LRESs of the side rocket units, this confirming the reliability of the launch vehicle of the combined scheme.

What is claimed is:

1. A method for refining a multifunctional combined scheme launch vehicle with cruise LRESs, the method comprising the steps of:

selecting size-mass characteristics of a central rocket unit and thrust characteristics of its cruise LRES;

selecting characteristics of acceleration rocket units and thrust characteristics of their cruise LRESs;

designing and manufacturing said rocket units, forming from said rocket units a tandem scheme launch vehicle having a monounit lower stage;

conducting ground-based and flight-structural tests of the tandem scheme launch vehicles, wherein a level of adjustment of a thrust of the central rocket unit cruise LRES is set within a range of 0.3–1.0 of its nominal thrust;

forming a lower multiunit stage from side rocket units which are identical by size-mass characteristics and thrust characteristics of the cruise LRES to the central rocket unit refined on the tandem scheme launch vehicle, wherein data obtained from tests of the tandem scheme launch vehicle with the monounit lower stage are used for confirming reliability of the side rocket units with the cruise LRESs of the combined scheme launch vehicle.

* * * * *

UNITED STATES PATENT AND TRADEMARK OFFICE
CERTIFICATE OF CORRECTION

PATENT NO. : 6,712,319 B2
APPLICATION NO. : 10/336813
DATED : March 30, 2004
INVENTOR(S) : Anatoly Ivanovich Kiselev et al.

It is certified that error appears in the above-identified patent and that said Letters Patent is hereby corrected as shown below:

<u>Title page,</u>
Item [75], Inventors, change "Evegeny Ivanovich" to -- Evegeny Ivanovich Motorny --.
Item [73], Assignees, delete "Gosudarstvenny Kosmichesky Nauchno-Proizvodstvenny Tsentr TM.M.V Khrunicheva" and insert -- Gosudarstvenny Kosmichesky Nauchno-Proizvodstvenny Tsentr IM.M.V. Khrunicheva --.

Signed and Sealed this

Fourth Day of July, 2006

JON W. DUDAS
*Director of the United States Patent and Trademark Office*

UNITED STATES PATENT AND TRADEMARK OFFICE
CERTIFICATE OF CORRECTION

PATENT NO.         : 6,712,319 B2
APPLICATION NO. : 10/336813
DATED              : March 30, 2004
INVENTOR(S)        : Anatoly Ivanovich Kiselev et al.

It is certified that error appears in the above-identified patent and that said Letters Patent is hereby corrected as shown below:

Title page, item (75) "Inventors" on the front page of the above-identified patent, change "Evgeny Ivanovich" to -- Evgeny Ivanovich Motorny--.

Signed and Sealed this

Tenth Day of July, 2007

JON W. DUDAS
*Director of the United States Patent and Trademark Office*

UNITED STATES PATENT AND TRADEMARK OFFICE
CERTIFICATE OF CORRECTION

PATENT NO.        : 6,712,319 B2
APPLICATION NO.   : 10/336813
DATED             : March 30, 2004
INVENTOR(S)       : Anatoly Ivanovich Kiselev et al.

It is certified that error appears in the above-identified patent and that said Letters Patent is hereby corrected as shown below:

Title Page, item (73) should read as follows: -- Assignees Federalnoe Gosudarstvennoe Unitarnoe Predpriyatie Gosudarstvenny Kosmichesky Nauchno-Proizvodstvenny Tsentr im.M.V. Khrunicheva --.

Signed and Sealed this

Seventh Day of October, 2008

JON W. DUDAS
*Director of the United States Patent and Trademark Office*